United States Patent
Kim

(10) Patent No.: US 12,377,583 B2
(45) Date of Patent: Aug. 5, 2025

(54) AUTOMATIC GEL RIBBON THICKNESS ADJUSTMENT DEVICE

(71) Applicant: CHANGSUNG SOFTGEL CO., LTD, Pocheon-si (KR)

(72) Inventor: Ju-Su Kim, Seoul (KR)

(73) Assignee: CHANGSUNG SOFTGEL CO., LTD, Pocheon-si (KR)

( * ) Notice: Subject to any disclaimer, the term of this patent is extended or adjusted under 35 U.S.C. 154(b) by 127 days.

(21) Appl. No.: 18/335,562

(22) Filed: Jun. 15, 2023

(65) Prior Publication Data
US 2024/0165858 A1    May 23, 2024

Related U.S. Application Data

(63) Continuation of application No. PCT/KR2022/018653, filed on Nov. 23, 2022.

(30) Foreign Application Priority Data

Dec. 19, 2022    (KR) .......................... 10-2022-0178565

(51) Int. Cl.
  *B29C 41/52*    (2006.01)
  *B29C 41/26*    (2006.01)
  *B29C 41/36*    (2006.01)

(52) U.S. Cl.
  CPC .............. *B29C 41/52* (2013.01); *B29C 41/26* (2013.01); *B29C 41/36* (2013.01)

(58) Field of Classification Search
  CPC .......... B29C 41/52; B29C 41/26; B29C 41/36
  See application file for complete search history.

(56) References Cited

U.S. PATENT DOCUMENTS

| | | | |
|---|---|---|---|
| 9,452,140 B2 * | 9/2016 | Kim | A23P 10/30 |
| 2003/0209027 A1 * | 11/2003 | Owens | A01J 25/12 |
| | | | 62/342 |

(Continued)

FOREIGN PATENT DOCUMENTS

| | | | | |
|---|---|---|---|---|
| KR | 10-0704098 B1 * | 4/2007 | | A61J 3/07 |
| KR | 10-0954227 B1 * | 4/2010 | | A61J 3/07 |

(Continued)

OTHER PUBLICATIONS

Machine translation KR20150136700A (Year: 2015).*

(Continued)

*Primary Examiner* — Abbas Rashid
*Assistant Examiner* — Wayne K. Swier
(74) *Attorney, Agent, or Firm* — Jefferson IP Law, LLP

(57) ABSTRACT

An automatic gel ribbon thickness adjustment device is provided. The automatic gel ribbon thickness adjustment device includes a driving device installed on a spreader box for supplying liquid gelatin to a casting drum by spreading the liquid gelatin in a sheet form, a blocking plate of the spreader box moves vertically by the driving device to adjust an opening width of an outlet, a thickness measurement device is installed on a path through which the gel ribbon in the casting drum is supplied to a forming machine, and a controller controls the driving device, the spreader box includes a blocking plate elastically supported on a box body having a hollow portion and is movable vertically, and the driving device presses the elastically supported blocking plate to stably adjust the thickness of the gel ribbon while adjusting the opening width of the outlet.

4 Claims, 14 Drawing Sheets

(56) References Cited

U.S. PATENT DOCUMENTS

2016/0017182 A1* 1/2016 Kim ................. C08L 89/06
                       210/182
2020/0054526 A1* 2/2020 Jung ................. B41F 17/36

FOREIGN PATENT DOCUMENTS

| KR | 2015-0136700 A | * | 12/2015 | ............... A61J 3/07 |
| WO | WO-2016132806 A1 | * | 8/2016 | ............ B29C 48/08 |
| WO | WO-2020261900 A1 | * | 12/2020 | |

OTHER PUBLICATIONS

Machine translation WO2016132806A1 (Year: 2016).*
Machine translation WO2020261900A1 (Year: 2020).*
Machine translation KR100704098B1 (Year: 2007).*
Machine translation KR100954227B1 (Year: 2010).*

* cited by examiner

AUTOMATIC GEL RIBBON THICKNESS ADJUSTMENT DEVICE

CROSS-REFERENCE TO RELATED APPLICATION(S)

This application is a continuation application, claiming priority under § 365(c), of an international application No. PCT/KR2022/018653, filed on Nov. 23, 2022, and is based on and claims the benefit of a Korean patent application number 10-2022-0178565, filed on Dec. 19, 2022, in the Korean Intellectual Property Office, the disclosure of which is incorporated by reference herein in its entirety.

BACKGROUND

1. Field

The disclosure relates to an automatic gel ribbon thickness adjustment device for supplying liquid gelatin by spreading the liquid gelatin in a sheet form. More particularly, the disclosure relates to an automatic gel ribbon thickness adjustment device which can automatically adjust a thickness of a gel ribbon while reducing malfunction occurred when a spreader box supplies the liquid gelatin by spreading the liquid gelatin in a sheet form and a load applied to a driving motor.

2. Description of Related Art

Generally, when a gelatin capsule manufacturing device supplies a raw material, which is supplied in a liquid state from gelatin supply devices, onto a casting drum in a sheet form in a state where the gelatin supply devices are provided symmetrically on both sides of the gelatin capsule manufacturing device, the casting drum cools and solidifies liquid gelatin, and guide rollers guide a gelatin sheet (also referred to as a gelatin ribbon or a gel ribbon) in the casting drum to supply the gelatin sheet to a forming machine. In this case, the forming machine laminates a pair of gelatin sheets (also referred to as gelatin ribbons or gel ribbons) guided by the guide rollers provided on left and right sides thereof, respectively, to form capsules, and at the same time, encapsulates the pair of gelatin sheets while injecting a chemical solution thereinto.

The gelatin supply device herein supplies the liquid gelatin to a spreader box, and the spreader box supplies the liquid gelatin onto the casting drum that is slowly rotated to form the liquid gelatin into a sheet form.

In this case, a thickness of the gel ribbon varies depending on a type and amount, or application of the chemical solution during encapsulation of the gelatin sheet (also referred to as a gelatin ribbon or a gel ribbon).

Therefore, the conventional gelatin supply device adjusts a thickness of a gelatin ribbon, which is discharged manually, by forming an adjustment knob on the spreader box to adjust a height of an outlet.

In the above method, a worker adjusts the height of the outlet while visually and repeatedly measuring the thickness of the sheet, so that the thickness is inaccurately measured, a waiting time to readjust the thickness becomes longer, and a cost is lost.

Therefore, Applicant of the disclosure has separately developed an automatic gel ribbon thickness adjustment device (Korean Unexamined Patent Publication No. 10-1580825) capable of automatically adjusting a thickness of a gelatin sheet and supplying the gelatin sheet.

That is, Korean Unexamined Patent Publication No. 10-1580825 discloses an automatic gel ribbon thickness adjustment device which can automatically control a thickness of a gel ribbon, in which a driving device is separately installed on a spreader box for supplying liquid gelatin to a casting drum in a sheet form, a blocking plate is moved up and down by the driving device to adjust an opening width of an outlet, a thickness measurement device is installed on a path through which the gel ribbon is supplied, and a controller controls the driving device based on information measured through the thickness measurement device.

However, in the automatic gel ribbon thickness adjustment device as described above, the blocking plate, which is moved up and down, is simultaneously lifted and supported by driving motors provided on left and right sides, and maintains a state of the blocking plate constant, so that whenever the liquid gelatin contained in the spreader box is discharged out of the outlet, a considerable load is applied to the driving motors, resulting in failures.

According to an embodiment, as the driving motors provided on the left and right sides are operated unbalanced due to a wear state or pressure difference occurred when the blocking plate is moved up and down, the blocking plate may not move or malfunction.

Moreover, when a pressure, which is equal to or higher than a set pressure, is applied to the spreader box having a limited space and the liquid gelatin overflows out of the outlet, an area around the outlet is contaminated, and in this case, the driving device located around the blocking plate is also contaminated, so that it is possible to perform cleaning only when connected components are separated one by one.

In addition, the gel ribbon guided by the guide rollers is soft, and a thickness of the gel ribbon is changed during guiding, so that it is inevitable to measure the thickness when the gel ribbon is finally introduced into the forming machine, and oil needs to be applied to an inside and outside of the gel ribbon using an oil roller so as to prevent the gel ribbon from smearing on the guide rollers in the middle of guiding. This is because whenever a displacement sensor measures the thickness of the gel ribbon, the thickness of the gel ribbon may be erroneously measured due to a thickness of the oil applied to the inside and outside of the gel ribbon.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to adjust a thickness of a gel ribbon while reducing a load applied to a driving motor when liquid gelatin is received and supplied by being spread in a sheet form and stably moving a blocking plate.

Another aspect of the disclosure is to easily and detachably mount a driving device by modularizing the driving device mounted on a spreader box, so that even if liquid gelatin overflows and contaminates an area around the driving device, the modularized driving device can be immediately cleaned by being easily separated from the spreader box and secure convenience of setting.

Another aspect of the disclosure is to more accurately measure a thickness of a gel ribbon and automatically adjust the thickness of the gel ribbon.

Additional aspects will be set forth in part in the description which follows and, in part, will be apparent from the description, or may be learned by practice of the presented embodiments.

In accordance with an aspect of the disclosure, an automatic gel ribbon thickness adjustment device is provided. The automatic gel ribbon thickness adjustment device automatically controls a thickness of a gel ribbon, in which a driving device is installed on a spreader box for supplying liquid gelatin to a casting drum by spreading the liquid gelatin in a sheet form, a blocking plate of the spreader box is moved vertically by the driving device so as to adjust an opening width of an outlet, a thickness measurement device is installed on a path through which the gel ribbon in the casting drum guided by a guide roller is supplied to a forming machine, and a controller controls the driving device installed on the spreader box based on information measured through the thickness measurement device, wherein the spreader box of the automatic gel ribbon thickness adjustment device includes a blocking plate which is elastically supported on a box body having a hollow portion and is movable vertically, and the driving device presses the elastically supported blocking plate to stably adjust the thickness of the gel ribbon while adjusting the opening width of the outlet.

Therefore, in the disclosure, when an error occurs in the thickness of the gel ribbon, the thickness of the gel ribbon is adjusted, thereby minimizing unnecessarily wasted time or an amount of lost gelatin.

In particular, as the blocking plate of the spreader box is elastically supported, a lifted state of the blocking plate can be stably maintained, and as the opening width of the outlet is adjusted by pressurization of the driving device, a load applied to the driving motor can be minimized, and the thickness of the gel ribbon can be adjusted by stably moving the blocking plate.

In addition, in the disclosure, as the driving device is detachably assembled on the spreader box in a modularized state, the driving device can be cleaned after simply separating the entire driving device when the gelatin overflows.

In addition, in the disclosure, after the displacement sensor, which is provided on the guide wall, stably and accurately measures the thickness of the gel ribbon passing through the mounting jig, oil is applied to the inside of the gel ribbon, such that the thickness of the gel ribbon can be more accurately adjusted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
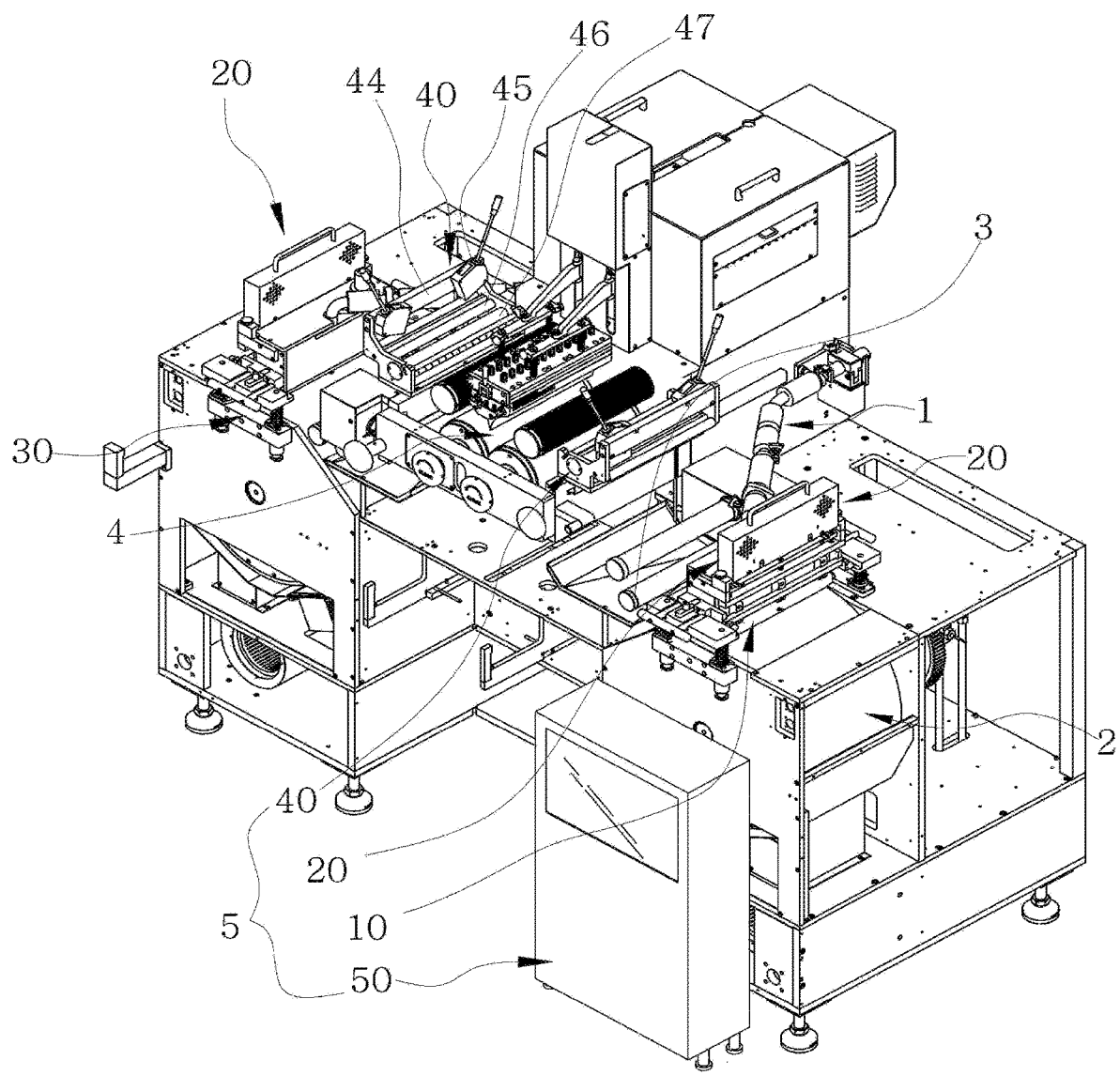
FIG. 1 is a perspective view showing a gelatin capsule manufacturing device mounted with an automatic gel ribbon thickness adjustment device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly, the embodiments described in the specification and the configurations shown in the drawings are merely preferred embodiments according to the disclosure, and do not represent all of the technical ideas of the disclosure. Therefore, it should be understood that various equivalents and modifications may be substituted therefor at the time of filing of the present application.

In addition, the expression "configured" or "formed" herein is not limited to its closed sense, and should be interpreted in "open" sense as "include" or "provide."

Hereinafter, a detailed description for carrying out the disclosure will be described below with reference to the accompanying drawings.

Figure 2:
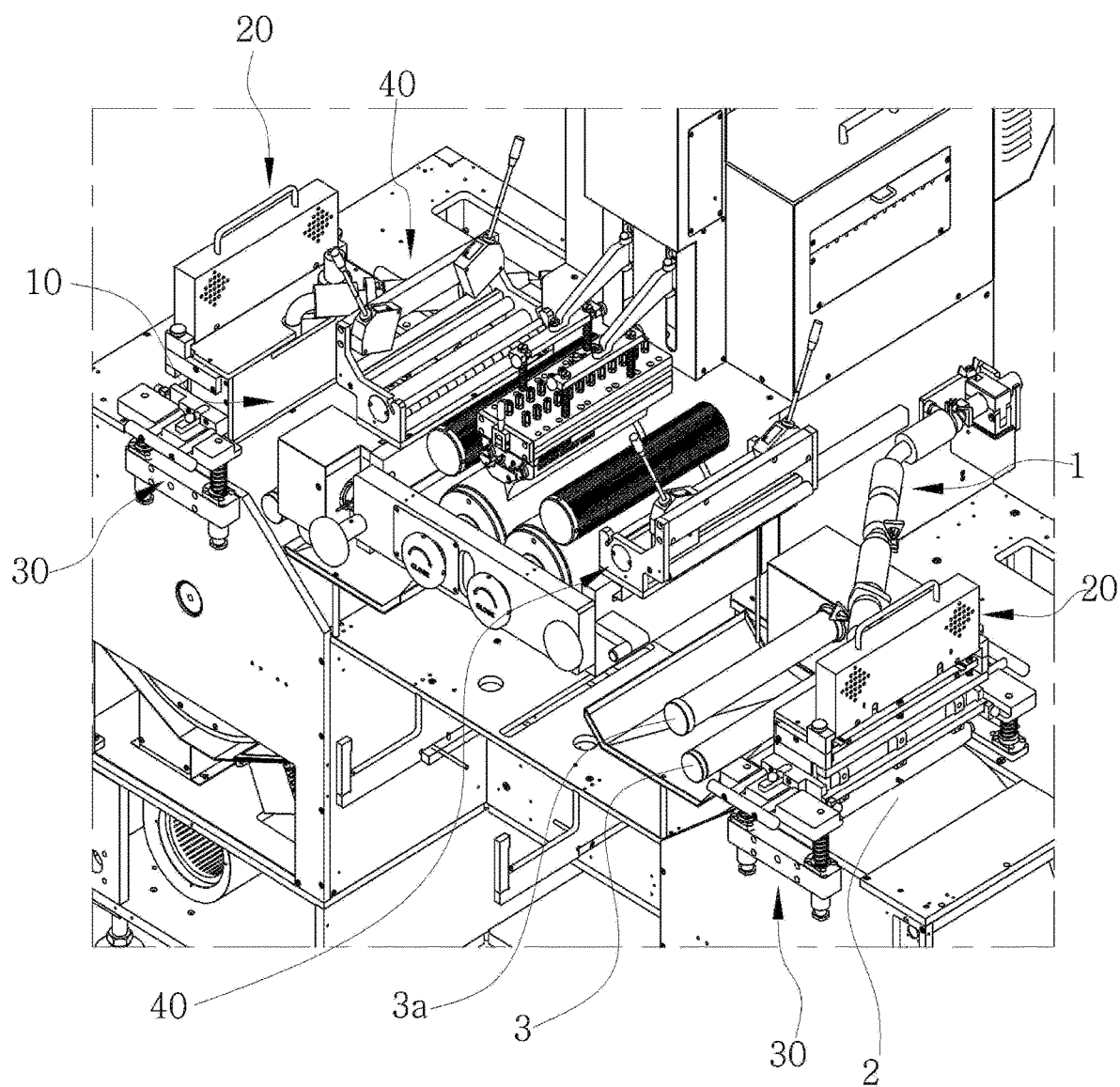
FIG. 2 is a partial enlarged view of the automatic gel ribbon thickness adjustment device in FIG. 1 according to an embodiment of the disclosure.
Figure 3:
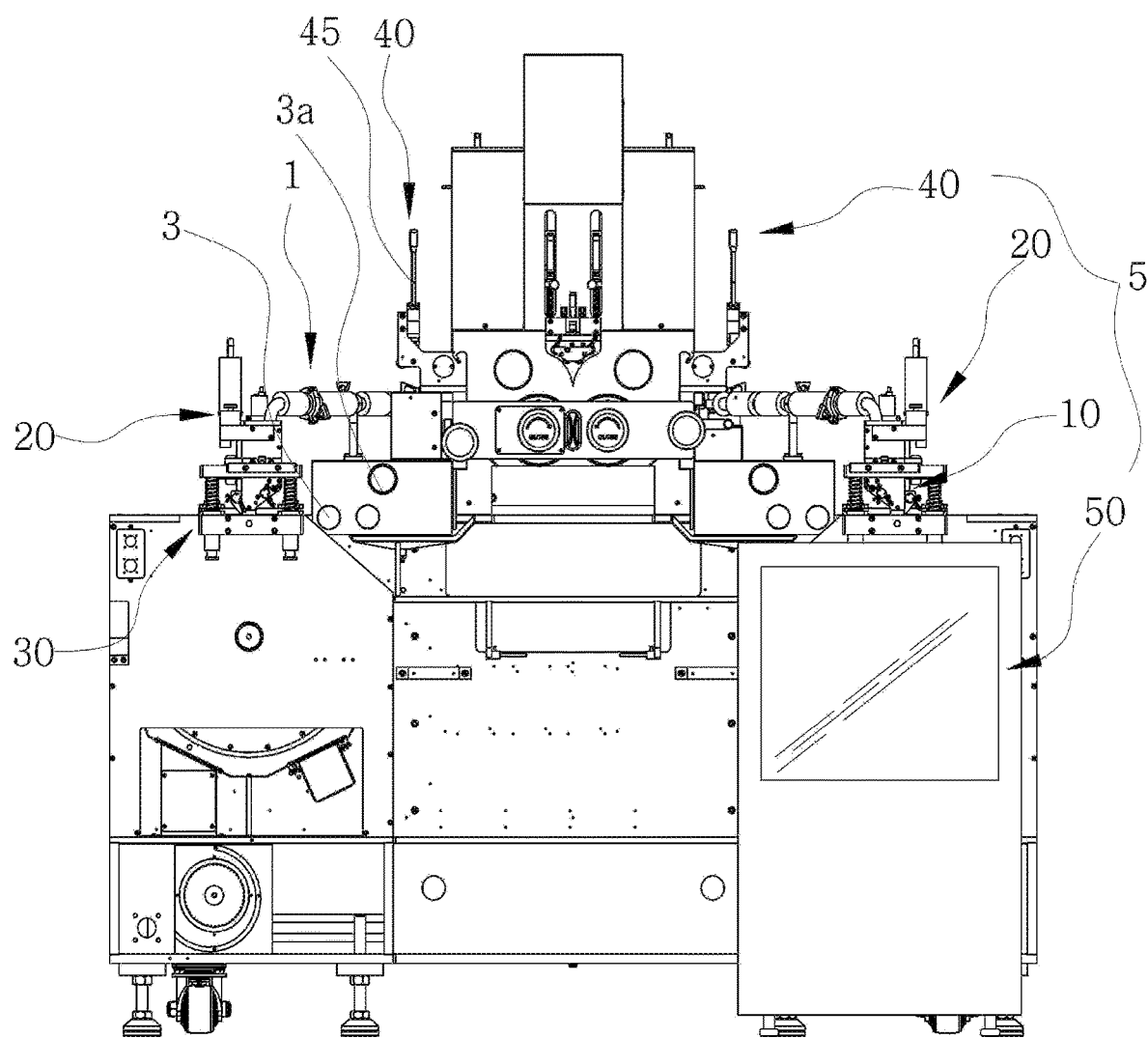
FIG. 3 is a front view of the gelatin capsule manufacturing device in FIG. 1 according to an embodiment of the disclosure.
Figure 4:
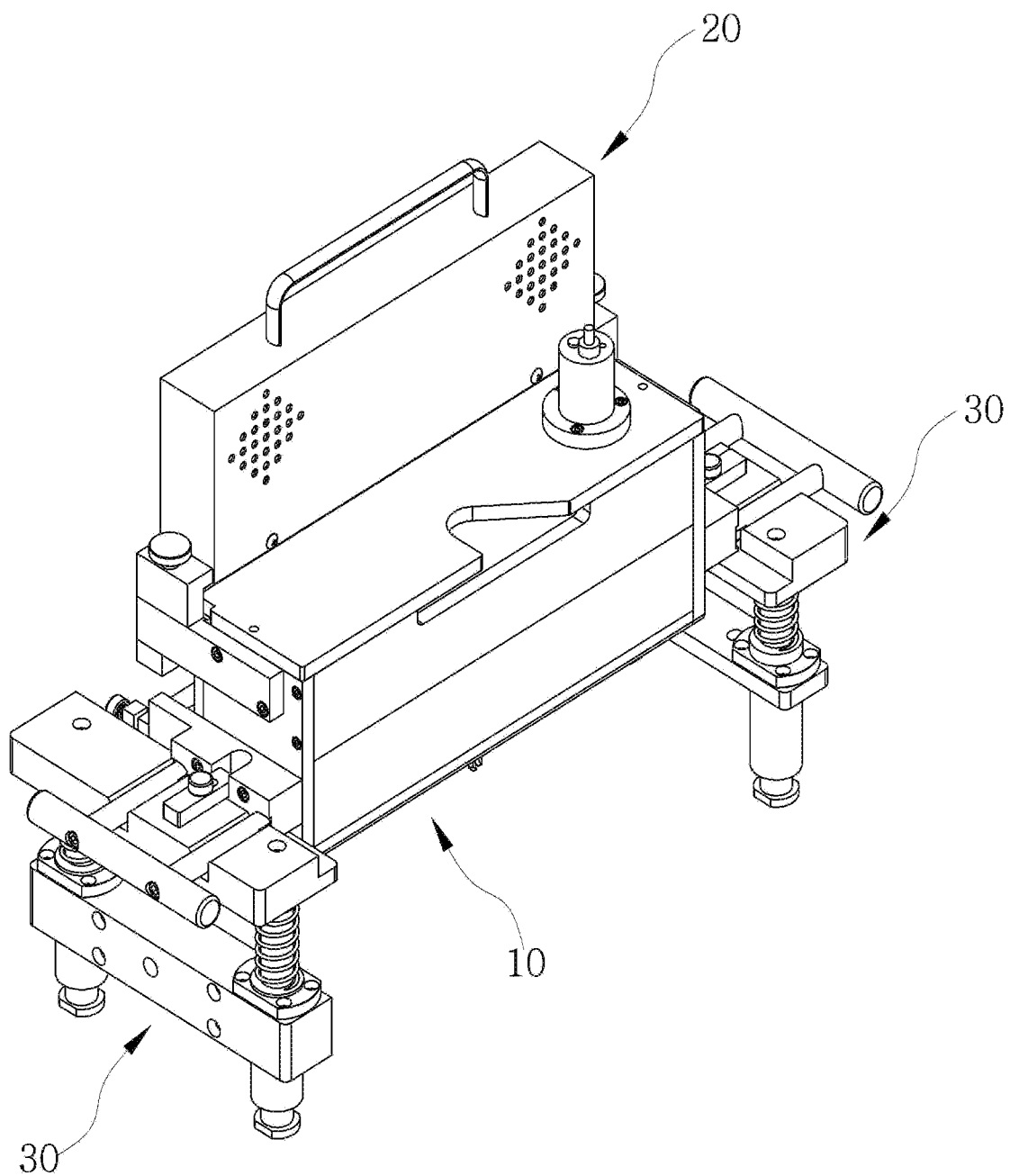
FIGS. 4 and 5 are perspective views of a spreader box and a driving device provided on a left side and a right side of the automatic gel ribbon thickness adjustment device, respectively, according to various embodiments of the disclosure.
Figure 5:
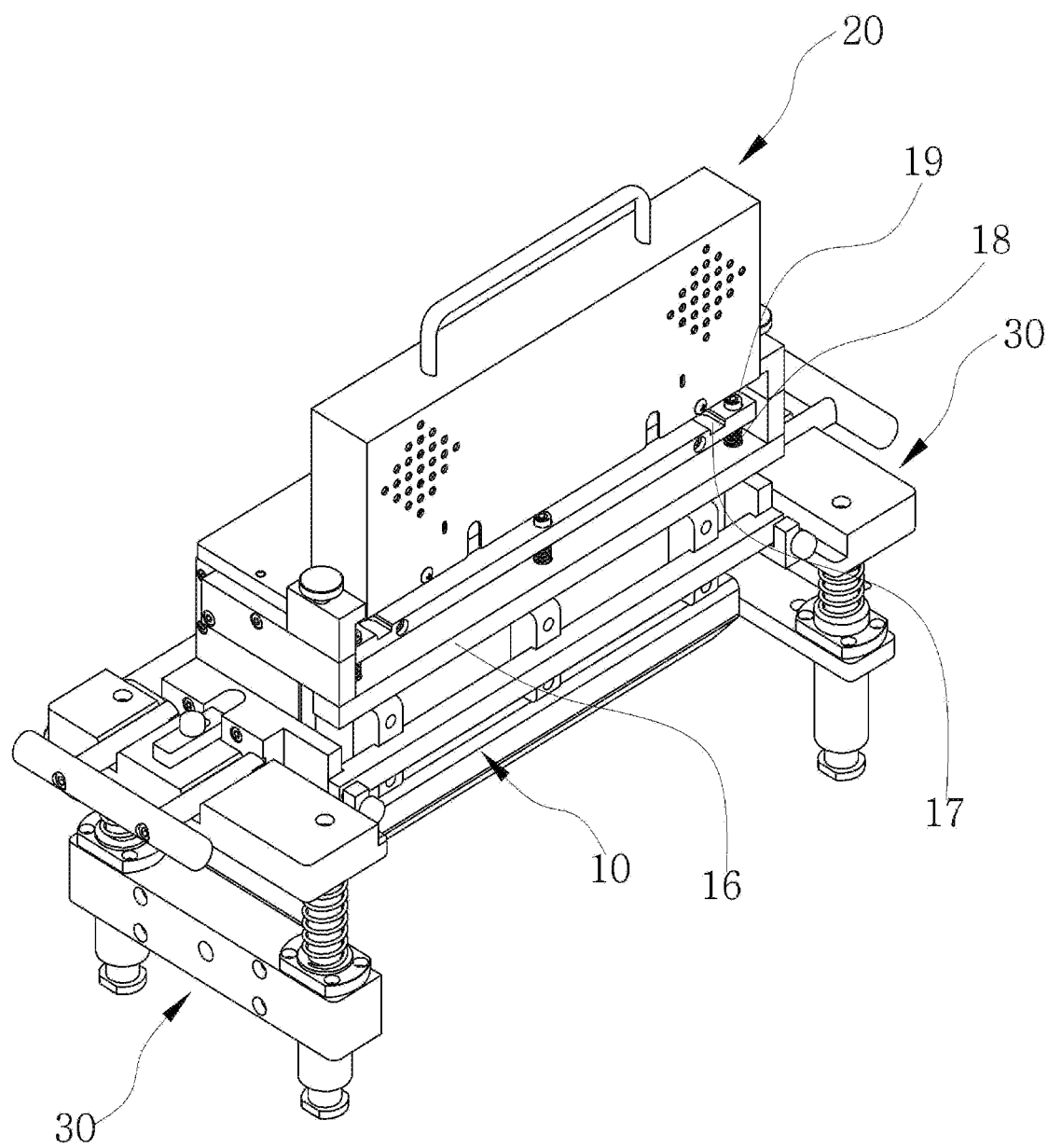
Figure 6:
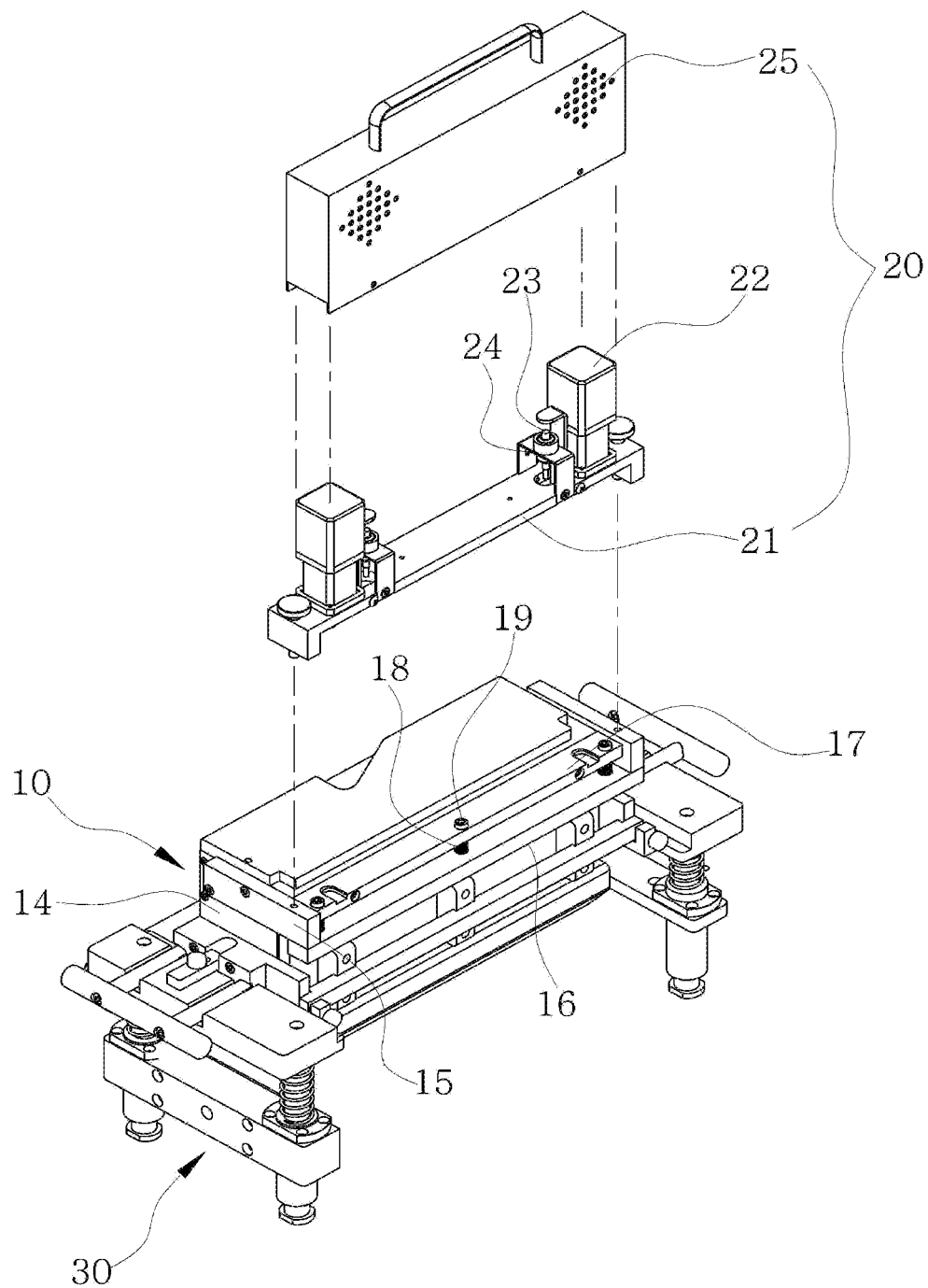
FIG. 6 is an exploded perspective view of the spreader box and the driving device according to an embodiment of the disclosure.
Figure 7:
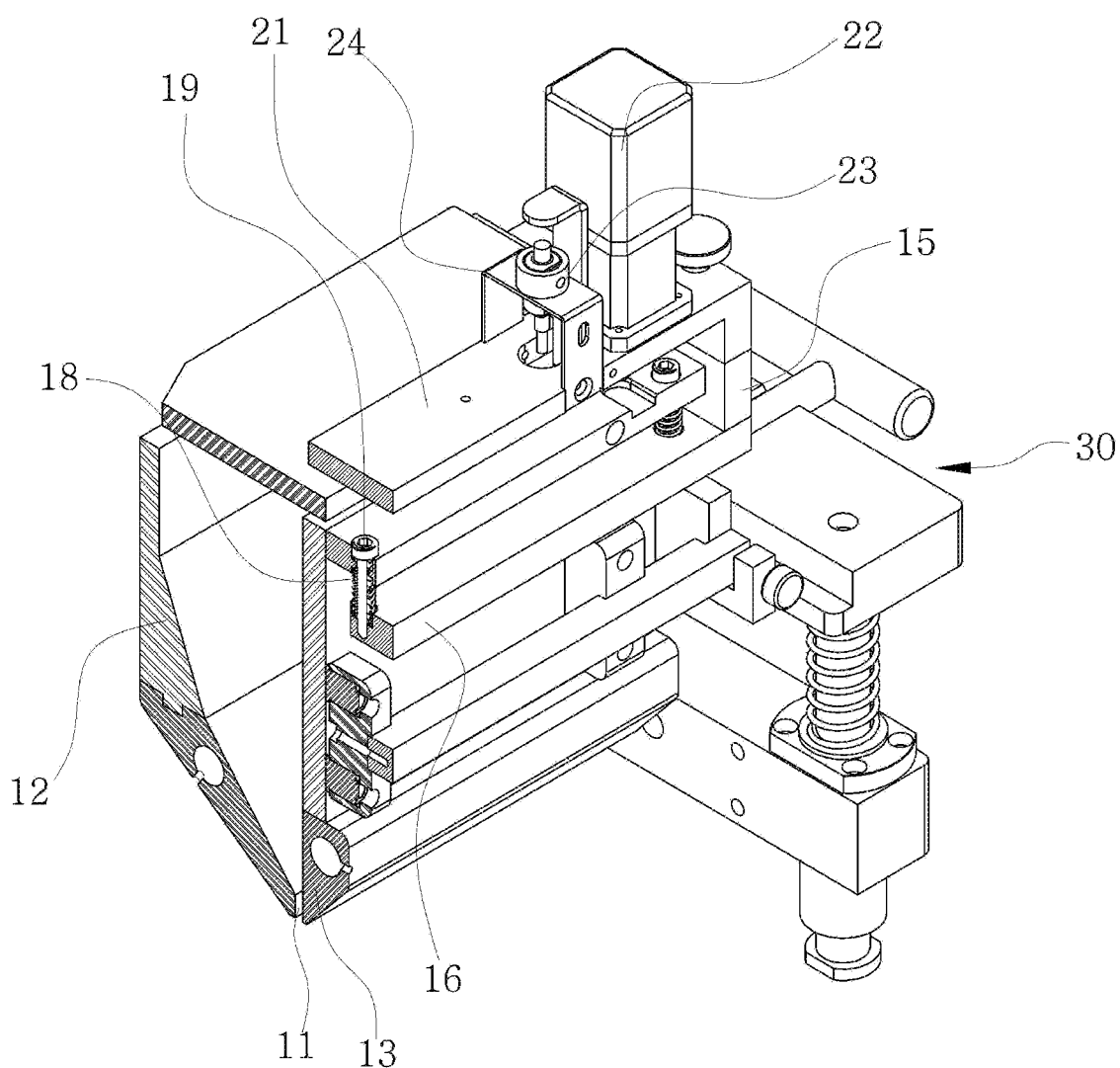
FIG. 7 is a cut-away perspective view of the spreader box and the driving device according to an embodiment of the disclosure.
Figure 8:
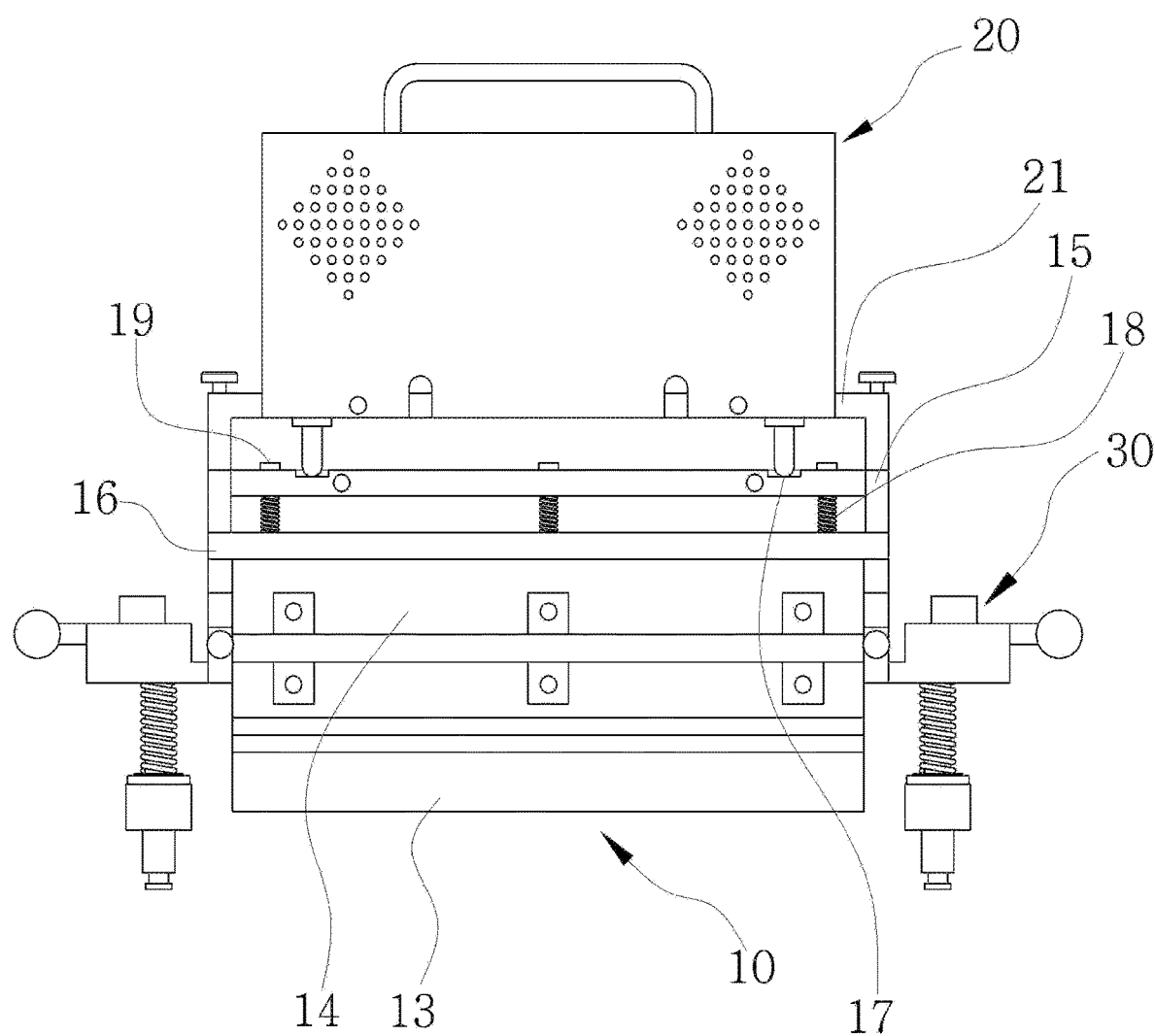
FIGS. 8, 9, and 10 are views showing operating states of the spreader box and the driving device according to various embodiments of the disclosure.
Figure 9:
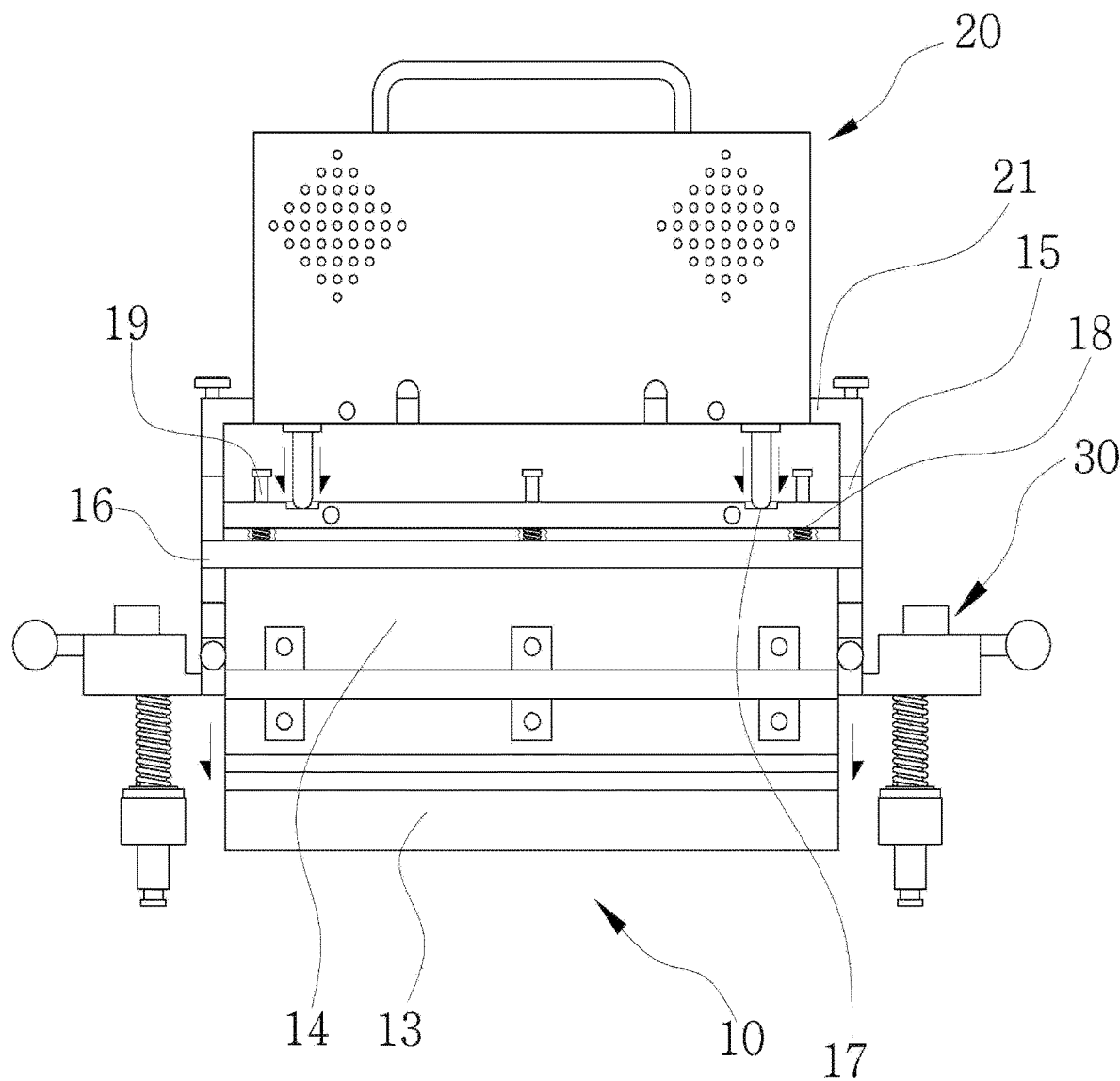
Figure 10:
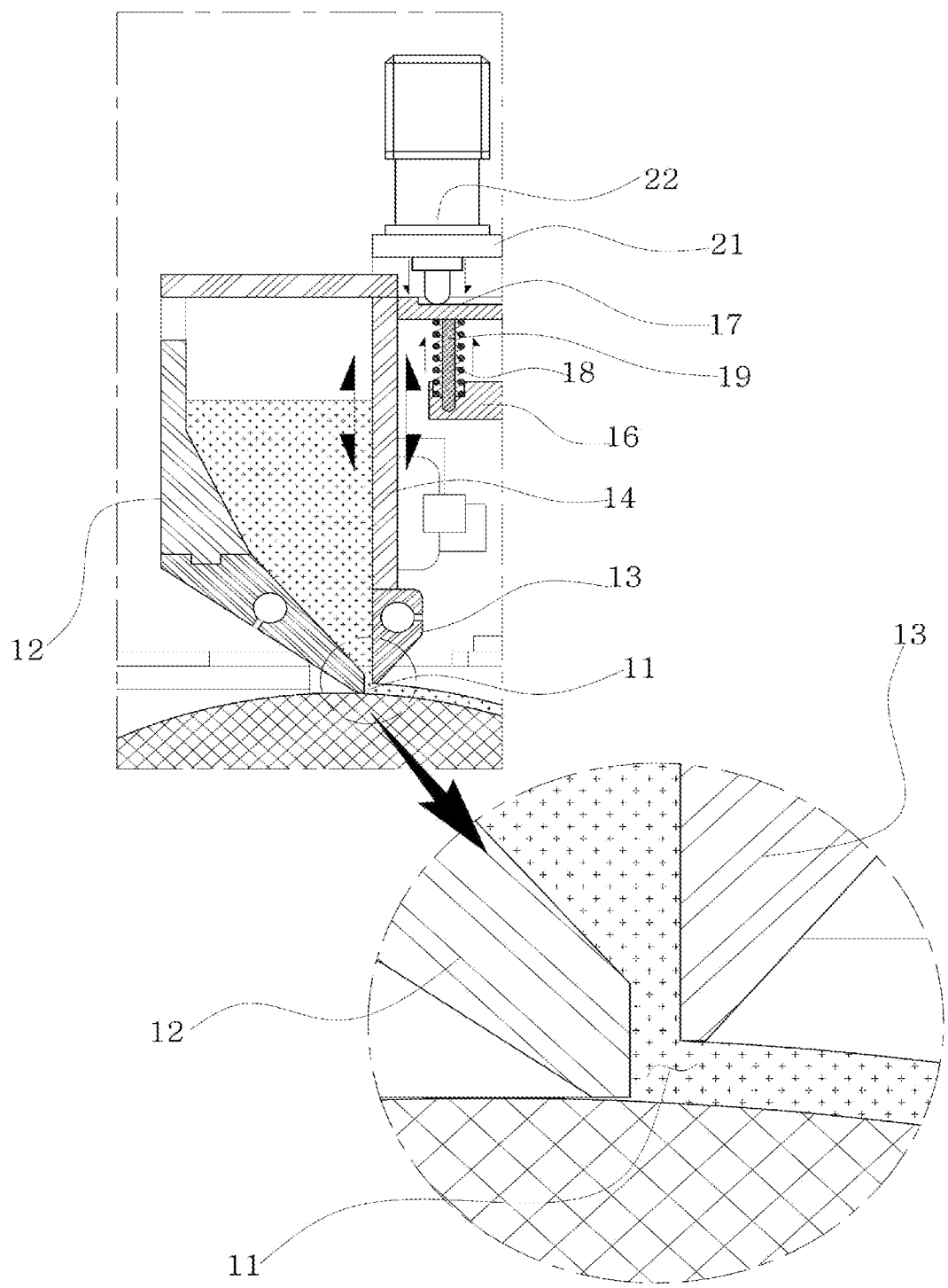
Figure 11:
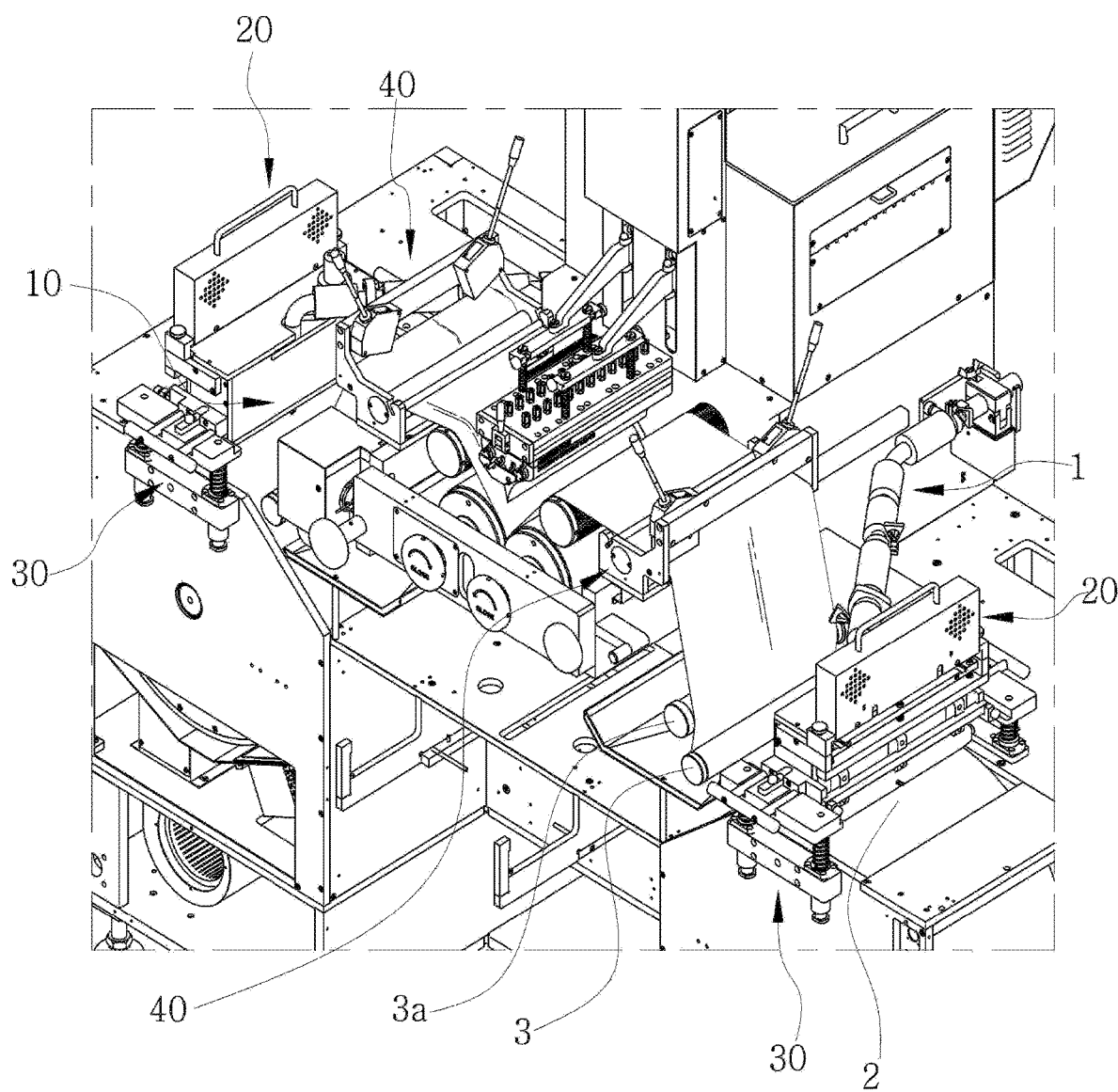
FIG. 11 is a partial perspective view showing a state where a gel ribbon is supplied to a forming machine according to an embodiment of the disclosure.
Figure 12:
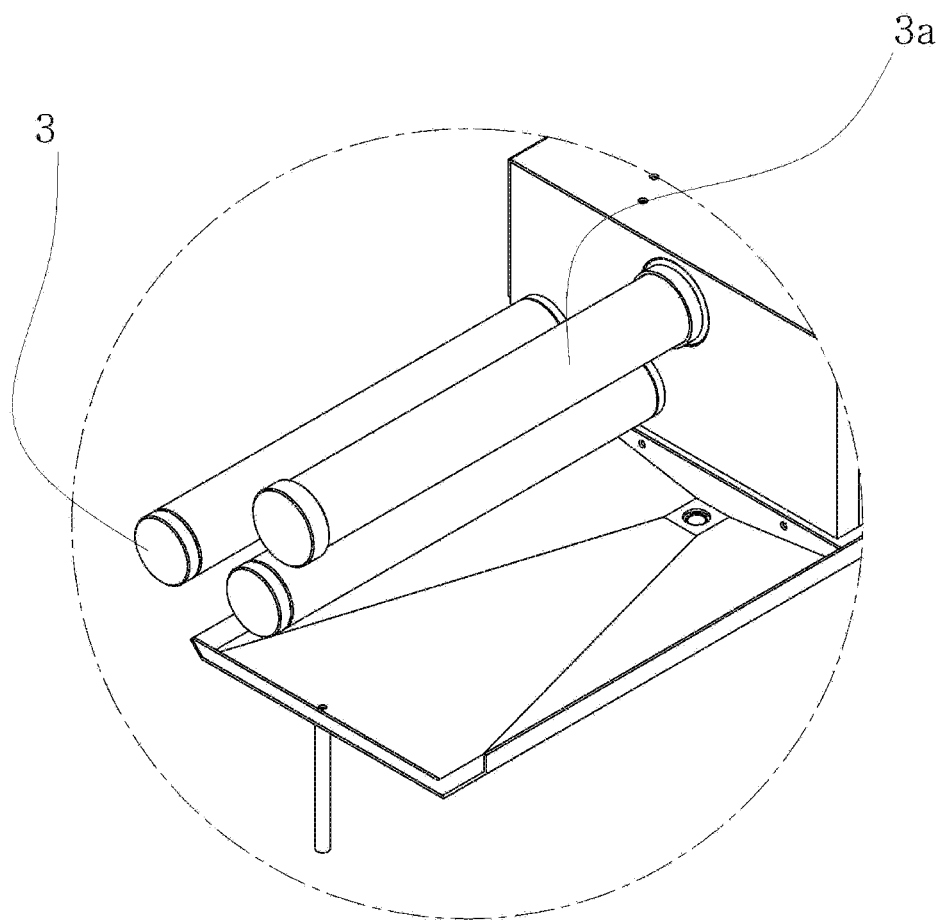
FIGS. 12 and 13 are perspective views of guide rollers and a thickness measurement device, respectively, according to various embodiments of the disclosure.
Figure 13:
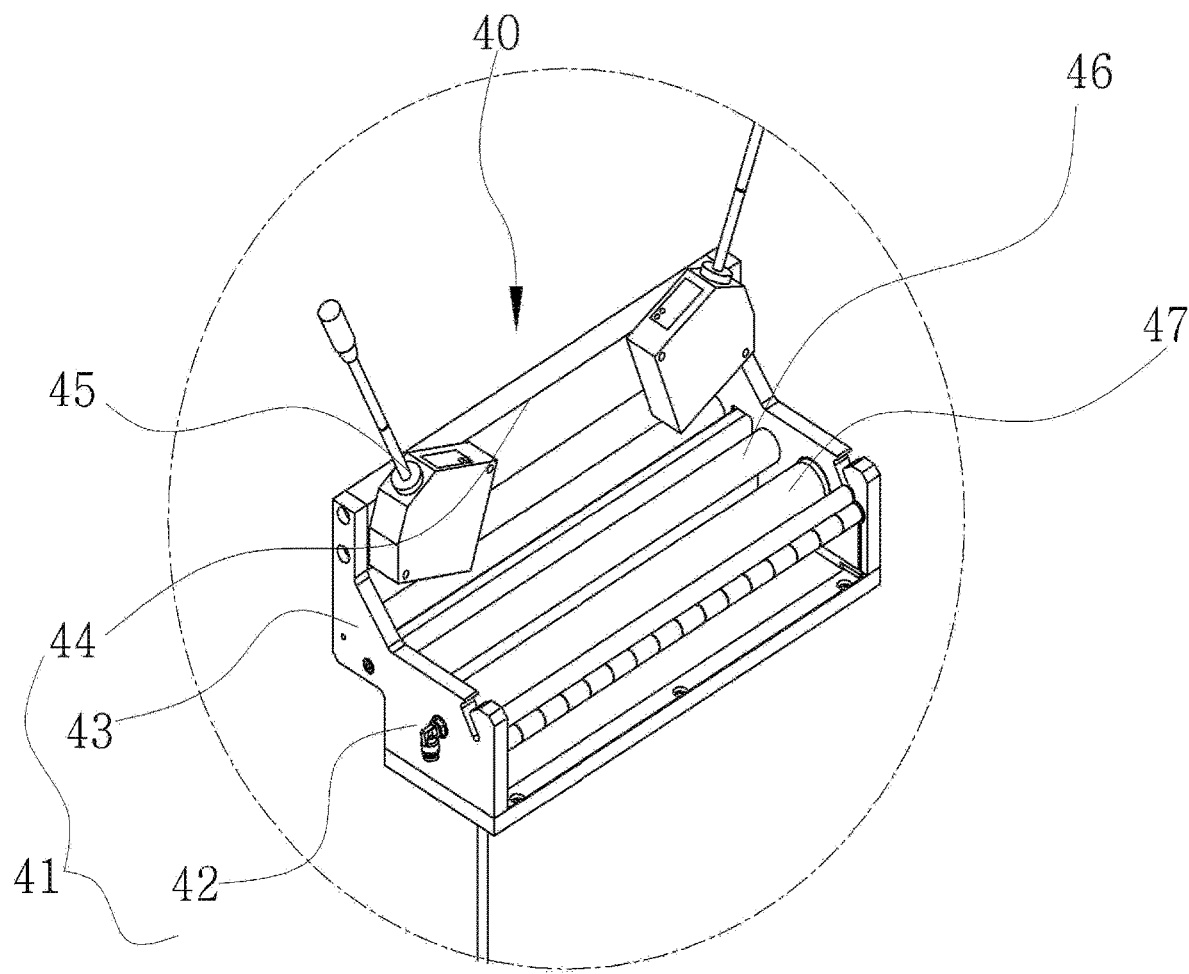
Figure 14:
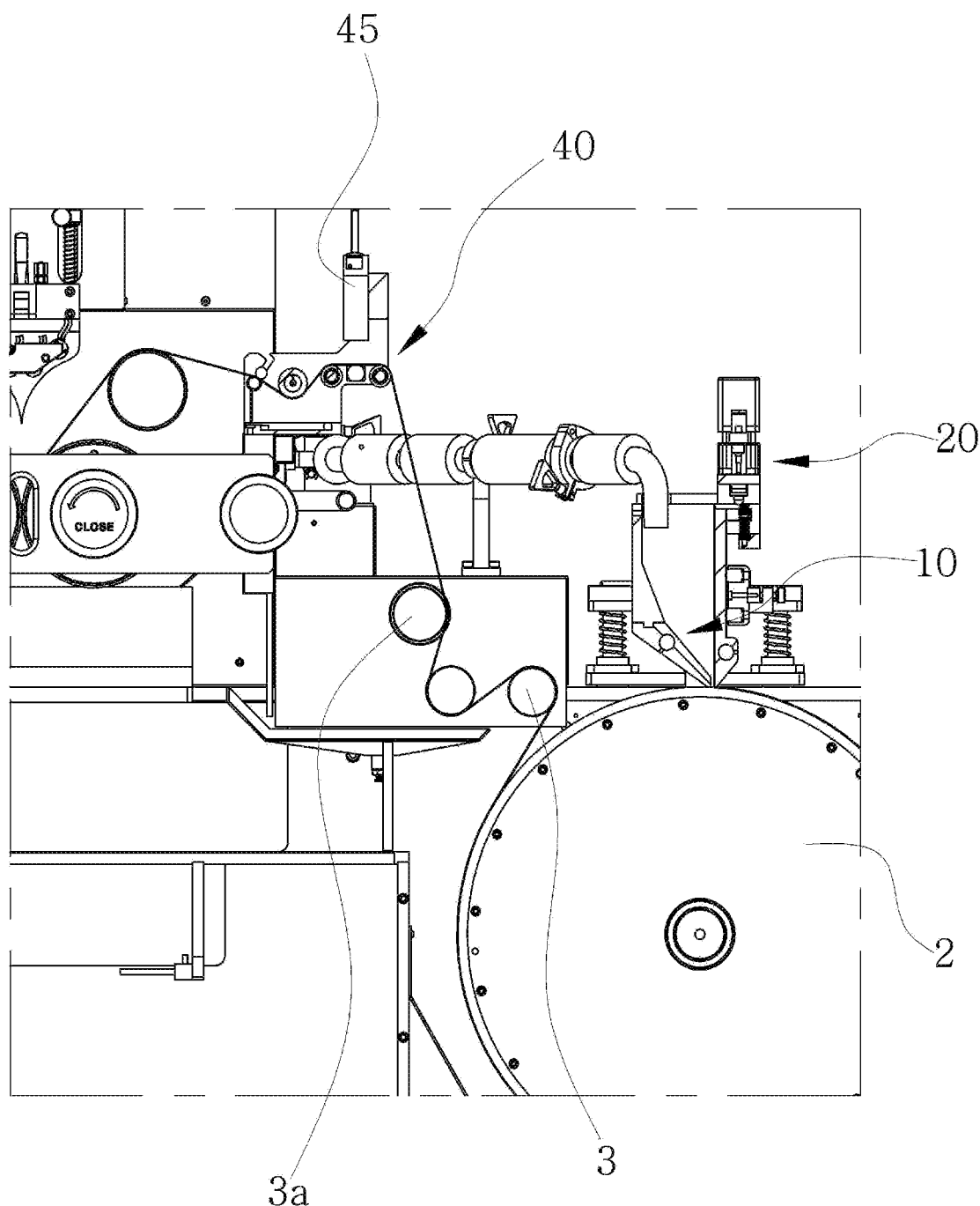
FIG. 14 is a view showing a state where a thickness of the gel ribbon is measured, in which the gel ribbon is supplied to the forming machine through the guide rollers and the thickness measurement device according to an embodiment of the disclosure.

FIG. 1 shows an overall appearance of a gelatin capsule manufacturing device mounted with an automatic gel ribbon thickness adjustment device according to an embodiment of the disclosure, FIG. 2 shows a partial enlarged automatic gel ribbon thickness adjustment device according to an embodiment of the disclosure, and FIG. 3 is a front view of FIG. 1 according to an embodiment of the disclosure.

Referring to FIGS. 1 to 3, a gelatin capsule manufacturing device of the disclosure manufactures an easy-to-take chemical solution capsule, in which in a state where gelatin supply devices 1 are provided symmetrically on both sides thereof, a raw material, which is supplied in a liquid state from the gelatin supply devices, is supplied onto a casting drum 2 by spreading the raw material in a sheet form, the casting drum cools and solidifies liquid gelatin, the gel ribbon solidified by the casting drum is supplied to a forming machine 4 while being guided by guide rollers 3, and the forming machine laminates a pair of gel ribbons, which is supplied by the guide rollers 3 provided on left and right sides thereof, to form a capsule, and at the same time, injects a chemical solution thereinto.

In this case, the gelatin capsule manufacturing device includes an automatic gel ribbon thickness adjustment device 5 which can automatically control a thickness of a sheet when the liquid gelatin is supplied by being spread in a sheet form.

The automatic gel ribbon thickness adjustment device 5 includes a spreader box 10 having an outlet 11 formed therein to supply the liquid gelatin in a sheet form, a driving device 20 for adjusting an opening width of the outlet 11 of the spreader box 10, a thickness measurement device 40 for measuring a thickness of a gel ribbon guided to the forming machine 4 by the guide rollers 3, and a controller 50 for controlling the driving device 20 installed on the spreader box by receiving a signal from the thickness measurement device 40.

FIGS. 4, 5, 6, 7, 8, 9, and 10 show states of the spreader box and the driving device of the automatic gel ribbon thickness adjustment device according to various embodiments of the disclosure.

Referring to FIGS. 4 to 10, in the automatic gel ribbon thickness adjustment device 5 according to an embodiment of the disclosure, the spreader box 10 includes a blocking plate 13 which is elastically supported on a box body 12 and is movable vertically, and the driving device 20 presses the elastically supported blocking plate 13 to stably adjust the thickness of the gel ribbon while adjusting the opening width of the outlet 11.

In this case, the spreader box 10 receives the liquid gelatin from a melting tank, which stores the liquid gelatin, and supplies the liquid gelatin onto the casting drum 2 by spreading the liquid gelatin in a sheet form, and the outlet 11 is laterally formed on a lower end of the spreader box 10 and is mounted closely to the casting drum 2.

In addition, the spreader box 10 has the blocking plate 13 mounted on the box body 12 having a hollow portion, in which the blocking plate 13 is slidably mounted in a vertical direction, and the opening width of the outlet 11 is adjusted while adjusting a height of the blocking plate 13 by the driving device 20.

In this case, a fixing rod 17 is provided on an upper rear portion of the blocking plate 13 in a horizontal direction, extension portions 15 are provided on left and right sidewalls 14 of the spreader box 10 to protrude rearward of the blocking plate 13, support rods 16 crossing the blocking plate 13 are fixed to the extension portions 15 on the left and right sidewalls, respectively, in a state where the support rods 16 are positioned below the fixing rod 17 to correspond to the fixing rod 17, and an assembling member 19 is provided in a space between the fixing rod 17 and the support rods 16 while being supported by an elastic body, so that as the blocking plate 13 is elastically supported by the support rods 16 positioned below the fixing rod and an elastic body 18, the outlet for discharging the gelatin can be stably maintained while maintaining a lifted state of the blocking plate 13.

In addition, the driving device 20 is configured to adjust the thickness of the gel ribbon while adjusting a width of the opened outlet 11 by moving the blocking plate 13 of the spreader box 10, in particular, the driving device 20 is detachably assembled in a state where the driving device is modularized on the blocking plate 13 of the spreader box 10.

In this case, the driving device 20 has a mounting plate 21 formed laterally by a length between the extension portions 15 on the left and right sidewalls, support portions are formed by downwardly bending left and right side ends of the mounting plate, and the support portions are detachably assembled using a fastening unit 26 in a state where the support portions are placed on the extension portions 15, respectively.

In addition, a plurality of driving motors 22 are provided on the mounting plate 21 so that left and right sides of the mounting plate 21 are not lifted to different heights due to a pressure at which the gelatin is discharged.

Each moving shaft of the driving motors perforates the mounting plate 21 to protrude downward at the same time when each driving motor 22 is operated so that the fixing rod is pressed, and a proximity sensor 23 is provided around each of the driving motors 22 to adjust a zero point according to moving up and down of the blocking plate 13. In this case, the proximity sensor 23 is fixedly installed on a mounting member 24 to check a position of the fixing rod 17 through the mounting plate 21, so that when the gelatin in the spreader box 10 overflows, the entire driving device 20 can be easily separated from the spreader box 10 only by releasing the fastening unit 26 provided on the support rod of the mounting plate 21, and the contaminated spreader box 10 can thus be easily cleaned and reset.

In addition, according to an embodiment, the driving device 20 may further include a protection case 25 that is detachably provided on the mounting plate 21.

Further, the proximity sensor 23 is configured to detect a position of the fixing rod 17 that moves up and down in a through-hole while being supported by the mounting member 24 by forming the through-hole in the mounting plate 21 in a vertical direction and installing the mounting member 24 around the through-hole, so that the blocking plate is safely moved by the driving motor in a limited range by setting the position when the outlet 11 is fully closed or fully opened as a reference point.

In addition, a leveling device 30 is configured to support the spreader box 10 by assembling the spreader box 10 and prevent the spreader box 10 from being in close contact with the casting drum 2 due to an excessive pressure, and the leveling device 30 includes a bracket for mounting the spreader box 10, a mounting member for mounting the bracket, a shaft for enabling a lifting operation in a state where the bracket is mounted on the mounting member, and a spring for maintaining a close contact state between the spreader box and the casting drum while reducing a load of the spreader device pressed by the casting drum.

In addition, a reference block, which is in close contact with a surface of the casting drum 2, may be mounted on a lower end of the spreader box 10, in which the reference block is preferably formed of a synthetic resin with good durability and low surface friction coefficient.

FIGS. 11, 12, 13, and 14 show configurations of the thickness measurement device according to various embodiments of the disclosure.

Referring to FIGS. 11 to 14, guide rollers 3 of the disclosure are to guide the gel ribbon cooled by the casting drum to the forming machine, and only one oil roller 3a is provided to apply oil to only an outer side of the gel ribbon when the soft gel ribbon is guided and supplied to the forming machine.

In particular, the thickness measurement device 40 is provided between the forming machine 4 and the guide rollers 3 to accurately measure the thickness of the gel ribbon when the soft gel ribbon is supplied to the forming machine.

In this case, the thickness measurement device 40 includes another guide roller 46 provided between left and right sidewalls of a mounting jig to supply the gel ribbon guided to the inside of a mounting jig 41, which is perforated in a front-rear direction, by the guide rollers 3 to the forming machine 4, and another oil roller 47 for applying oil to the inside of the gel ribbon just before the gel ribbon guided by the other guide roller 46 is supplied to the forming machine.

Moreover, support walls 43 protruding upward are formed on left and right sidewalls 42 of the mounting jig 41, a guide wall 44 is provided between the support walls 43 on the left and right sidewalls 42, and a displacement sensor 45, which measures the thickness of the gel ribbon, is provided on the guide wall, so that the displacement sensor 45 provided on the guide wall more stably and accurately measures the thickness of the gel ribbon passing through the mounting jig 41, and adjusts the thickness.

For reference, the controller 50 checks whether an error occurs by receiving a value through the displacement sensor of the thickness measurement device to compare a thickness value thereof with a thickness value set by an operator. Moreover, when an error occurs, the controller 50 generates a correction value for adjusting the thickness of the gel ribbon to correspond to the error, and then applies the correction value to the driving motors of the driving device 20, so that the driving motor presses the elastically supported blocking plate 13 to stably adjust the thickness of the gel ribbon.

In this case, the controller 50 may include a button or touch panel for adjusting the thickness of gelatin, and a display panel capable of checking the set value or the measured thickness value.

Moreover, when the thickness of the gel ribbon discharged from the spreader box 10 is corrected, the controller 50 has a delay time not to control the driving device 20 until the gel ribbon reaches the displacement sensor 45.

That is, when after the thickness is measured from the displacement sensor 45 the controller 50 controls the driving device 20 to correct the thickness of the gel ribbon and adjust the height of the blocking plate, the controller 50 repeatedly performs an operation in which a standby state is maintained/reflected during the delay time at which the gel ribbon discharged from the spreader box 10 is transferred until the gel ribbon reaches the displacement sensor 45 via the casting drum 2 and the guide rollers 3, and then the thickness of the gel ribbon is measured and corrected.

In addition, when an error of thickness of the gel ribbon is detected from the displacement sensor 45, the controller 50 preferably controls the blocking plate 13 of the spreader box 10 to gradually open without controlling the blocking plate 13 to instantaneously open, and in particular, a time to adjust the height of the blocking plate 13 preferably includes the delay time described above.

While the disclosure has been shown and described with reference to the various embodiments thereof, it will be understood by those skilled in the art that various changes in form and details may be made therein without departing from the spirit and scope of the disclosure as defined by the appended claims and their equivalents.

What is claimed is:

1. An automatic gel ribbon thickness adjustment device which controlling a thickness of a gel ribbon, the automatic gel ribbon thickness adjustment device comprising:
   a driving device disposed on a spreader box for supplying liquid gelatin to a casting drum by spreading the liquid gelatin in a sheet form, a blocking plate of the spreader box being moved vertically by the driving device to adjust an opening width of an outlet;
   a thickness measurement device disposed on a path through which the gel ribbon in the casting drum guided by a first guide roller is supplied to a forming machine; and
   a controller configured to, based on information measured through the thickness measurement device, control the driving device disposed on the spreader box;
   a fixing rod disposed in a horizontal direction on an upper rear portion of the blocking plate of the spreader box;
   support rods; and
   an assembling member,
   wherein extension portions are provided on left and right sidewalls of the spreader box to protrude rearward of the blocking plate,
   wherein the support rods crossing the blocking plate are fixed to the extension portions on the left and right sidewalls, respectively, in a state where the support rods are positioned below the fixing rod to correspond to the fixing rod,
   wherein the assembling member is disposed in a space between the fixing rod and the support rod, which are positionally corresponding to each other, while being supported by an elastic body,
   wherein the blocking plate is elastically supported on a box body having a hollow portion and the blocking plate is movable vertically,
   wherein the driving device presses the elastically supported blocking plate to adjust the thickness of the gel ribbon while adjusting the opening width of the outlet,
   wherein the driving device includes a plurality of driving motors on a mounting plate which is laterally formed by a length between the extension portions on the left and right sidewalls,
   wherein each moving shaft of the driving motors protrudes downward at a same time when each driving motor is operated so that the fixing rod is pressed to move the blocking plate downward,
   wherein support portions are formed by downwardly bending left and right side ends of the mounting plate corresponding to the extension portions, and
   wherein the support portions are detachably assembled using a fastener in a state where the support portions are placed on the extension portions, respectively.

2. The automatic gel ribbon thickness adjustment device of claim 1,
wherein the mounting plate includes a through-hole,
wherein a proximity sensor is provided above the through-hole on a mounting member to check a position of the fixing rod through the mounting plate, and
wherein the proximity sensor is configured to adjust a zero point to move the blocking plate up and down within a limited range.

3. The automatic gel ribbon thickness adjustment device of claim 2, further comprising:
a protection case disposed on the mounting plate to protect the plurality of driving motors and the proximity sensor.

4. The automatic gel ribbon thickness adjustment device of claim 1,
wherein the thickness measurement device includes a second guide roller provided between left and right sidewalls of a mounting jig perforated in a front-rear direction, the second guide roller supplying the gel ribbon guided by the first guide roller to the forming machine,
wherein the thickness measurement device further includes an oil roller for applying oil to an inside of the gel ribbon just before the gel ribbon is supplied to the forming machine,
wherein support walls protruding upward are formed on the left and right sidewalls of the mounting jig,
wherein a guide wall is provided between the support walls on the left and right sidewalls, and
wherein a displacement sensor, which measures the thickness of the gel ribbon, is provided on the guide wall to measure the thickness of the gel ribbon passing through the mounting jig.

* * * * *